US012638326B2

(12) United States Patent (10) Patent No.: US 12,638,326 B2
Bernegger et al. (45) Date of Patent: May 26, 2026

(54) GRAVIMETRIC METERING UNIT FOR FLOWABLE BULK MATERIAL

(71) Applicant: K-TRON TECHNOLOGIES INC., Sewell, NJ (US)

(72) Inventors: Men Bernegger, Zurich (CH); Rolf Lehmann, Ammerswil (CH); Urs Helfenstein, Seengen (CH)

(73) Assignee: K-TRON TECHNOLOGIES INC., Sewell, NJ (US)

( * ) Notice: Subject to any disclaimer, the term of this patent is extended or adjusted under 35 U.S.C. 154(b) by 154 days.

(21) Appl. No.: 18/691,656

(22) PCT Filed: Sep. 14, 2022

(86) PCT No.: PCT/IB2022/058648
§ 371 (c)(1),
(2) Date: Mar. 13, 2024

(87) PCT Pub. No.: WO2023/042085
PCT Pub. Date: Mar. 23, 2023

(65) Prior Publication Data
US 2025/0035479 A1 Jan. 30, 2025

(30) Foreign Application Priority Data
Sep. 15, 2021 (CH) .................................. 70274/2021

(51) Int. Cl.
G01G 13/00 (2006.01)
G01G 17/04 (2006.01)
(Continued)

(52) U.S. Cl.
CPC ........... G01G 13/003 (2013.01); G01G 17/04 (2013.01); G01G 21/23 (2013.01); G01G 21/28 (2013.01)

(58) Field of Classification Search
CPC ...... G01G 13/003; G01G 17/04; G01G 21/23; G01G 21/28; B65G 65/463; B65B 1/12
(Continued)

(56) References Cited

U.S. PATENT DOCUMENTS 2,340,030 A * 1/1944 Weyandt ................ G01G 11/08
198/813
3,100,584 A * 8/1963 Bauder ..................... B65B 1/46
141/147
(Continued)

FOREIGN PATENT DOCUMENTS

DE 19947516 A1 4/2001
EP 0486424 B1 6/1994
(Continued)

OTHER PUBLICATIONS

K-Tron Technologies, Inc., "Coperion K-Tron Product Information K4G Continuous Gravimetric Blender," Sep. 2016.
(Continued)

*Primary Examiner* — Christopher M Afful
(74) *Attorney, Agent, or Firm* — DINSMORE & SHOHL LLP

(57) ABSTRACT

A gravimetric metering unit includes a metering device including a container for bulk material to be metered and a base unit with a horizontally arranged conveyor for the bulk material. The container and the base unit can be separated from each other for maintenance purposes. The metering unit also comprises a frame that is equipped with at least one scale on which the metering device is supported during operation via a mounting such that the metering unit is designed for a gravimetric metering process. The mounting is connected to the container of the metering device and supports the metering device via the container. The container is provided with a rail which protrudes away from the container, and the base unit has a supporting structure which (Continued)

Figures 1A, 1B:
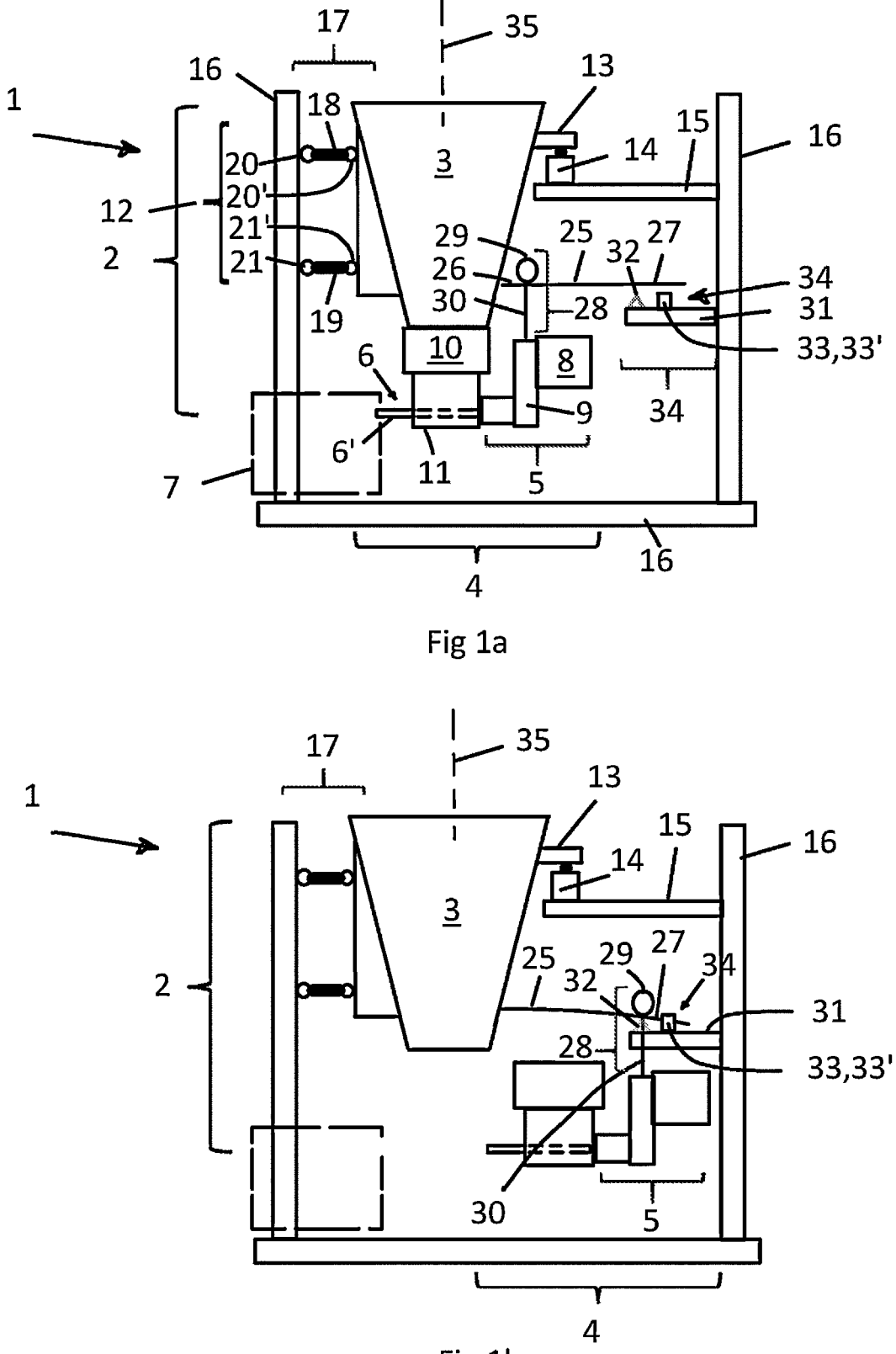

runs on the rail such that the supporting structure can be moved back and forth between an operating position and a maintenance position.

17 Claims, 6 Drawing Sheets

(51) Int. Cl.
*G01G 21/23* (2006.01)
*G01G 21/28* (2006.01)

(58) Field of Classification Search
USPC ........................................................... 141/83
See application file for complete search history.

(56) References Cited

U.S. PATENT DOCUMENTS 3,107,819 A * 10/1963 Black .................. G01G 11/083
273/157 R
3,241,716 A * 3/1966 Wahl .................... G01G 11/083
222/55
6,057,514 A * 5/2000 Maguire ............... B29C 48/375
366/76.1
2003/0024955 A1* 2/2003 Maguire ............... B01F 35/453
222/559
2021/0364340 A1* 11/2021 Helfenstein .......... G01G 13/248

FOREIGN PATENT DOCUMENTS

WO 2006010475 A1 2/2006
WO 2020245183 A1 12/2020

OTHER PUBLICATIONS

International Search Report and Written Opinion for Application No. PCT/IB2022/058648 mailed Dec. 13, 2022 20 pages.

* cited by examiner

GRAVIMETRIC METERING UNIT FOR FLOWABLE BULK MATERIAL

This application is a national phase entry under 35 U.S.C. § 371 of PCT Application Serial No. PCT/IB2022/058648 filed on Sep. 14, 2022, which claims priority to CH070274/2021 filed on Sep. 15, 2021, the entire contents of which are hereby incorporated by reference.

The present disclosure relates to a gravimetric metering unit according to the preamble of claim 1.

Gravimetric metering devices, also known as differential metering scales, are widely used in many branches of industry for all kinds of flowable or bulk materials, i.e. bulk materials, as long as they can be conveyed by a gravimetric metering device at all. The bulk materials are dispensed into a container, from this into a base unit located below it and from the metering device by a conveyor located in the base unit. The metering device is located on a scale, so the weight registered by the scale is the gross weight, i.e. the known and constant weight of the metering device components (tare) plus the variable weight of the bulk material currently present in the container and in the base unit (net weight).

In this manner, the scale continuously registers the weight loss of the entire metering device during operation, and thus, due to the constant weight of the metering device, the weight loss of the bulk material present in the metering device, so that a controller of the metering device can determine the actual mass flow of the bulk material dispensed from the weight loss and, in comparison with a predetermined target mass flow, control the dispensing conveyor accordingly in order to minimize the difference between the actual and target mass flows.

Very precise control of the output mass flow may be necessary, approximately in the area of pharmaceuticals or when color pigments are to be added in industrial manufacturing. In addition, the target mass flow can be small, approximately for the color pigments mentioned and in the production of medicines (e.g. a few kilos per hour), or large, for example in the area of plastics production and mining (e.g. more than 1 t per hour), wherein precise dosing may also be necessary for such conveying capacities.

All types of precise scales are often used, with a resolution over their weighing range of 1:100,000 and more, including those with vibrating wire sensors, such as those known approximately as SFT-III, SFT-II-M and SFT-II-L from Coperion K-Tron.

These scales have a resolution of up to 1:4,000,000, so that precision dosing can be carried out without any problems, even with a container capacity of several hundred kilos and a delivery rate of several tons per hour. If a resolution of 1:1 000 000 is used, for example, the dispensed mass flow of 1 kg/s (3.6 t/h) can still be recorded to an accuracy of 1/10 g with a container capacity of 100 kg and then used for metering. For small mass flows, the mass flow can then be measured to an accuracy of 1/100 g or 1/1000 g.

In order to utilize the precision of the scales for metering, non-vertical, i.e. horizontal or inclined conveyors are employed in some embodiments, as the fluid-dynamic behavior of the bulk material can be controlled somewhat better in this manner, as gravity does not act in the conveying direction with horizontal conveyors and thus does not interfere. Longer screw conveyors are well suited as horizontal conveyors, as the actual flow rate can be varied quite easily and without distortion via their rotational speed and the distance from the mass flow from the hopper to a collecting container located outside the metering unit can be bridged well without any disadvantages in the actual mass flow itself.

The brochure K4G-L Group, K-Tron Product Information, K4G Continuous Gravimetric Blender shows an arrangement of gravimetric metering units with different hopper volumes and precision scales that allow high-precision feeding at different flow rates as required.

Depending on the bulk materials being conveyed, regular maintenance is essential, especially cleaning of the base unit of the metering device, i.e. the conveyor such as a screw conveyor.

WO 2006/010 475 shows a metering unit with a metering device for bulk materials and a frame for the metering device, which has a vertical, short screw. The metering device is assembled on a plate-shaped extension of the frame, wherein the frame or the extension carries the bulk material container on the one hand and the base unit of the metering device on the other via a vertical guide rod arranged on it. The base unit can be lowered and rotated along the guide rod and can thus be serviced without having to be completely separated and removed from the metering device.

It is further generally disclosed that the shown arrangement for gravimetric metering can also be placed on a scale, but it remains open how. In addition, the arrangement shown cannot be used for longer screw conveyors or particularly for horizontal screw conveyors.

It is the object of embodiments of the present disclosure to further develop a metering unit with precision scales and a non-vertical, for example horizontally arranged conveyor in such a manner that the base unit is more easily accessible for maintenance.

This object is solved by the characterizing features of claim 1.

The fact that the metering device is suspended from the frame through its container and the rail is in turn arranged on the container itself means that there is no need for a complex, double suspension system that supports the container on the one hand and the base unit on the other, but rests on the scales as a whole to record the weight of both the container and the metering device.

Beyond the object set, the limiting arrangement according to the features of claim 2 also enables a simplified, cost-effective suspension to be used, which is only designed for stress in the direction of the weight force, but not for stress caused by the forces acting in all directions during maintenance.

Embodiments are described in more detail below with reference to the figures.

Figure 2A:
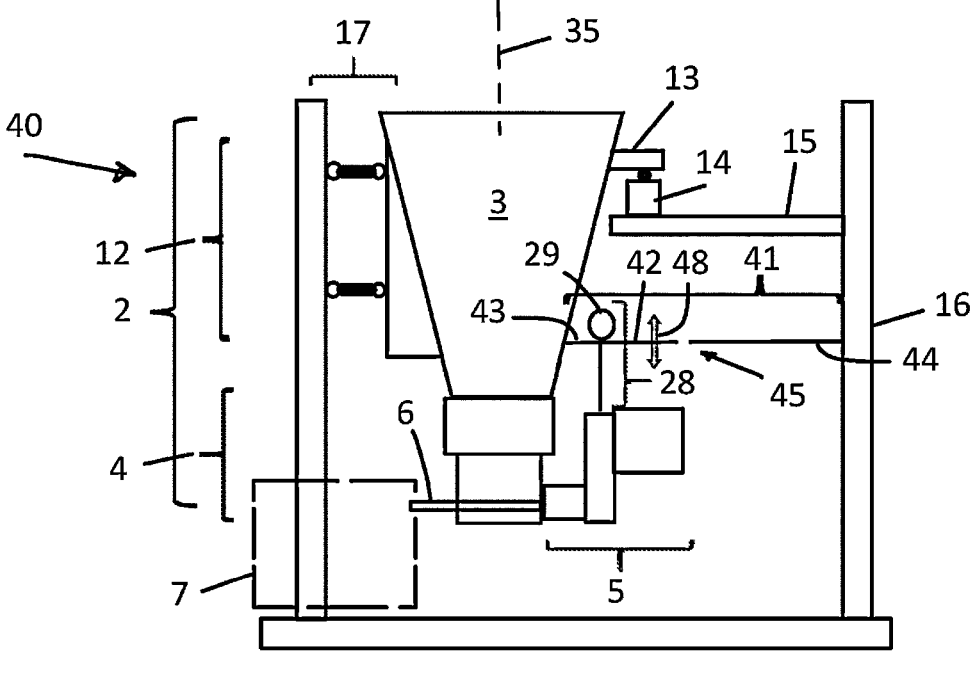
Figure 2B:
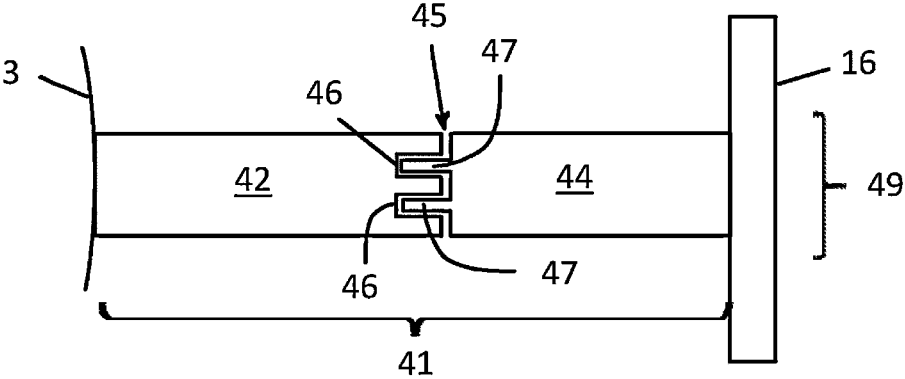
Figures 3A, 3B:
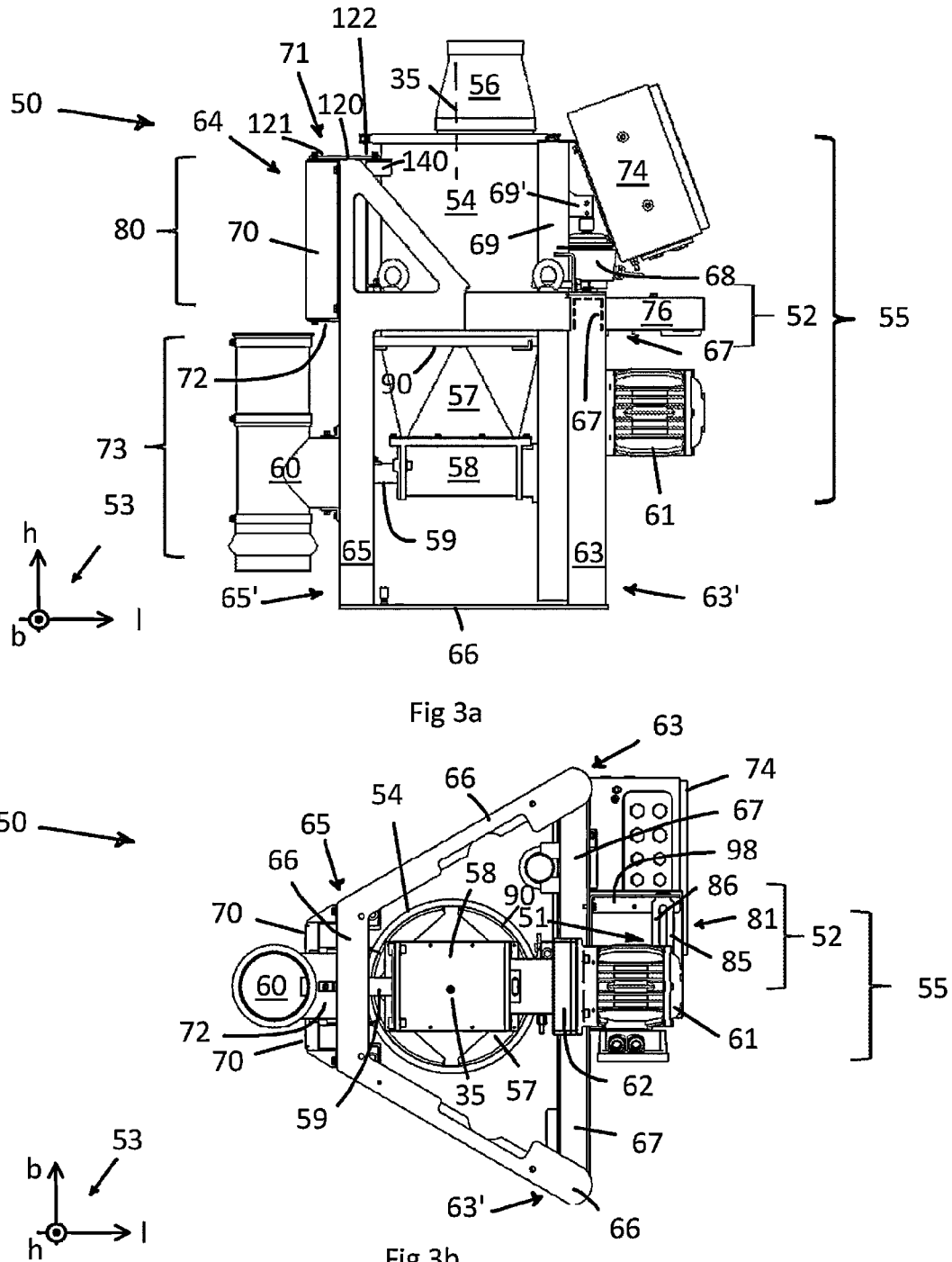
Figure 3C:
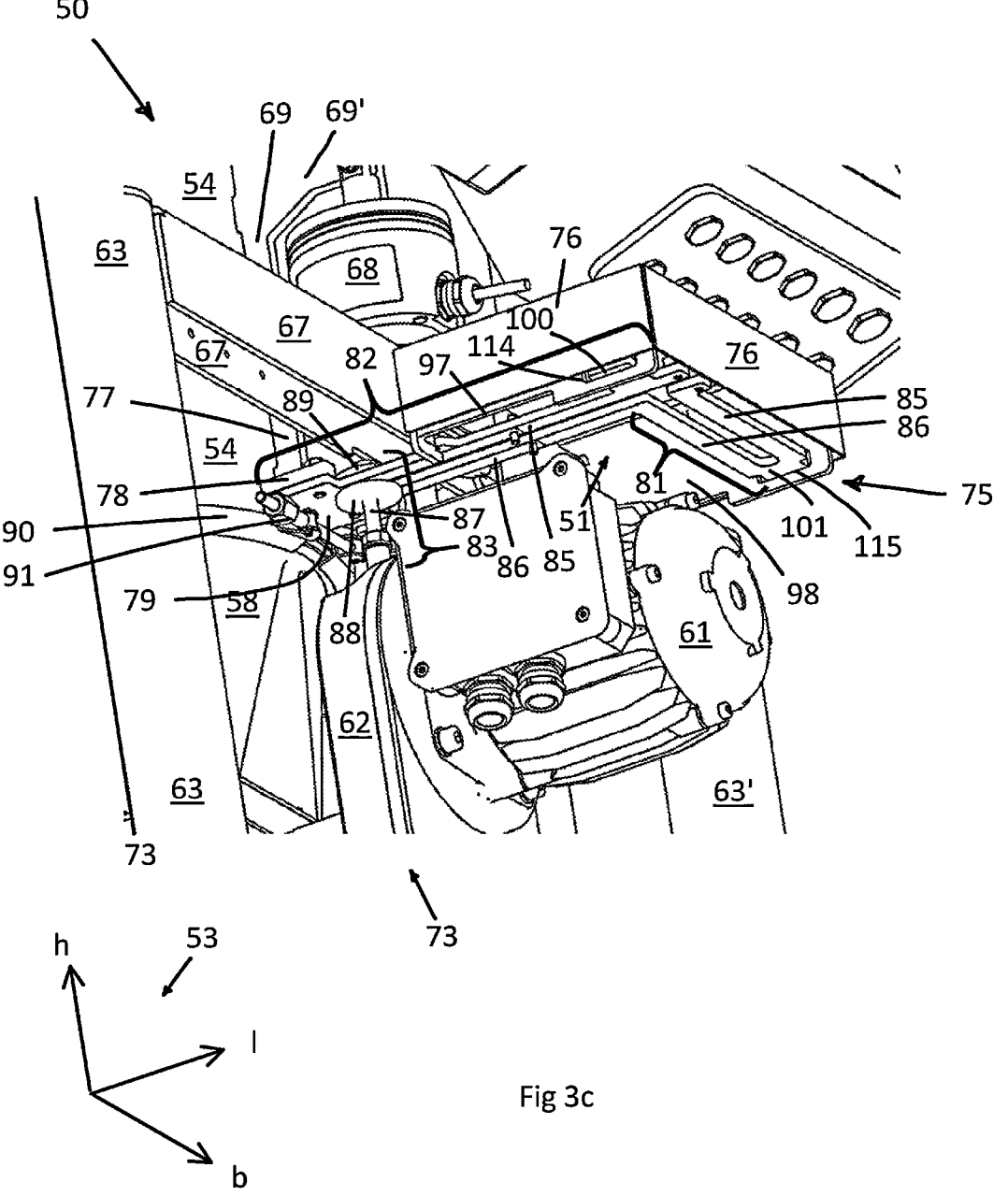
Figure 3D:
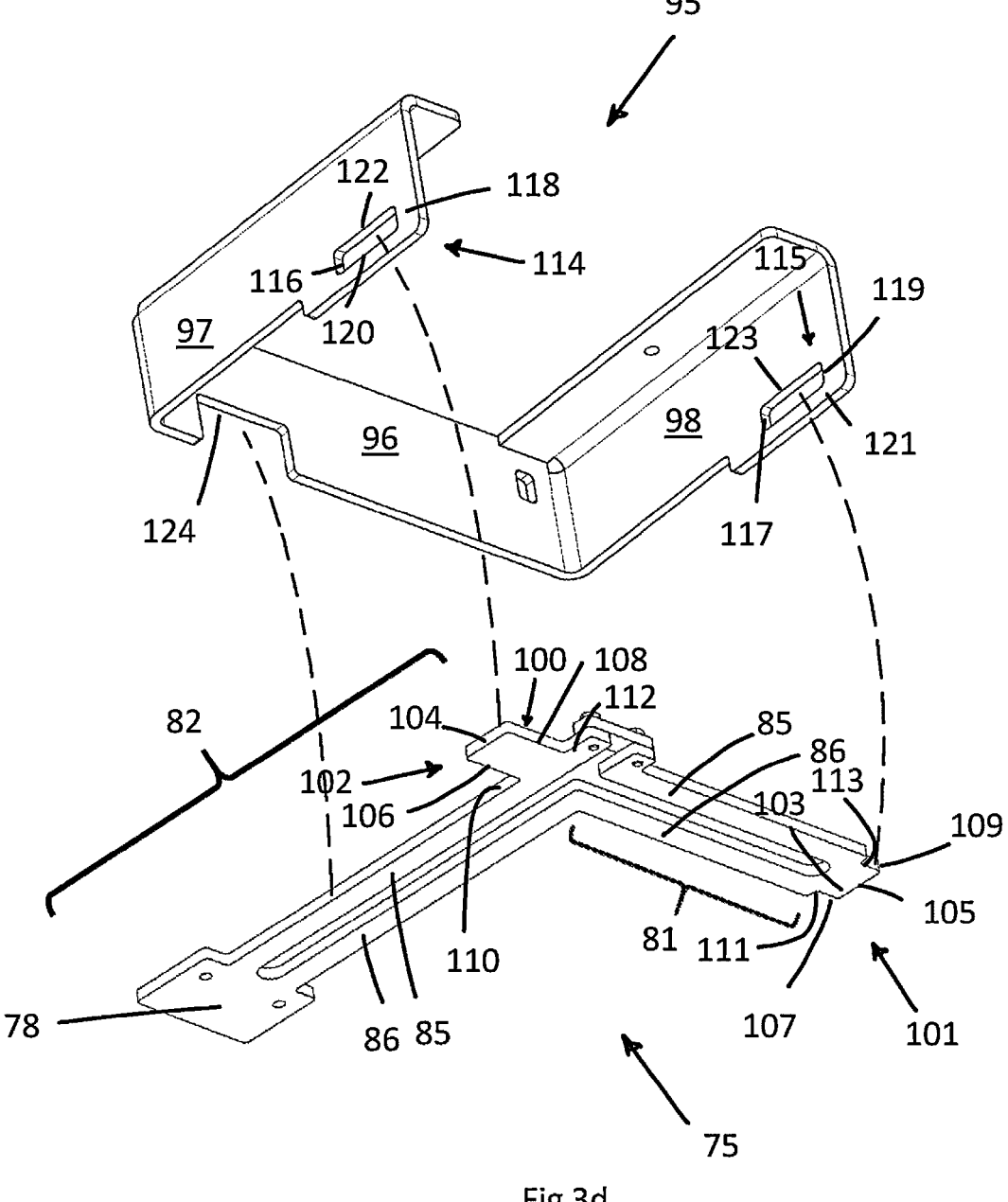

In the figures:

FIGS. 1*a* and 1*b* show a schematic embodiment,

FIGS. 2*a* and 2*b* show a further schematic embodiment,

FIGS. 3*a* to 3*c* show a view of a further embodiment,

FIG. 3*d* shows a three-dimensional partial view of the embodiment in accordance with FIGS. 3*a* to *c*, and FIGS. 4 and 5 show a three-dimensional detailed view of two embodiments of the parallel arms of a parallel guide for the container of the metering unit.

FIG. 1*a* shows a metering unit 1 with a metering device 2, which has a funnel-shaped container 3 for bulk material and a base unit 4. The base unit 4 in turn has a drive 5 and a horizontally aligned conveyor with a screw conveyor 6 driven by it, wherein the conveyor ends in a collector 7 indicated by a dashed line. Furthermore, the drive 5 has a motor 8 and a gearbox 9 to which the conveyor is connected. A controller for the motor 8 and thus the rotational speed of the screw conveyor 6 is known to the person skilled in art and has been omitted to relieve the figure. In the embodiment shown, a transition funnel 10 to a conveying container 11 is also provided, in which the screw conveyor 6, insofar as it extends in this, is drawn in dashed lines. It should be noted that although the screw conveyor 6 is widely used for horizontal conveying, persons skilled in art are also aware of conveyors designed differently and not suitable for vertical conveying.

During operation, bulk material is filled into the container 3, which falls out of this via the transition hopper 10 into the conveying container 11 and is conveyed there to the left into the collector 7 by the screw conveyor 6 running in a conveying pipe 6'.

A suspension 12 supports the metering device 2 on its right side via a cantilever 13 on a scale 14, which in turn rests on a suitably designed support 15 of the frame 16. The suspension 12 supports the metering device 2 on its left side via a parallel guide 17, which in the embodiment shown has an upper parallel arm 18 and a lower parallel arm 19, wherein the parallel arms 18, 19 are provided with end joints 20, 20' and 21, 21' and are thus connected to the frame 16 and the container 3 in such a manner that the latter is suspended such that it can move in a vertical direction relative to the frame 16.

The result is a gravimetric metering unit, with the frame 16, the metering device 2 and the suspension 12, in which the suspension for example has a parallel guide 17, which is connected on the one hand to the frame 16 and on the other hand to the container 3 of the metering device 2, in such a manner that the container 3 is suspended so as to be vertically movable relative to the frame 16.

The controller (omitted to relieve the figure, as mentioned above) can continuously determine the weight of the metering device 2 in gravimetric operation from the weighing signal of the scale 14 and the geometry of the arrangement shown, and thus control the motor 8 for exact metering by the screw conveyor 6. Due to the vertical movement of the parallel guide 17, the container 3 and thus the metering device 2 is free from the influence of the frame in the vertical direction, so that the scale 14 can determine the actual weight of the metering device 2. It should be noted that, depending on the scale 14 used, the necessary vertical displacement by the parallel guide 17 can also be very small, particularly if the scale 14 is designed as a vibrating wire scale. Nevertheless, the metering device 2 must be decoupled from the frame 16 at a vertical interval corresponding to the scale used with regard to vertical forces in order to ensure correct weighing and thus precise metering by the metering unit 1.

The figure also shows a rail 25, which is fixed to the container 3 at its inner end area 26 and is free-floating with the other, outer end area 27, but can for example be deflected downwards in a spring-elastic manner.

On the rail 25 runs a supporting structure 28, with a running element 29 and a mast 30, on which the base unit 4 hangs, so that it can be moved back and forth along the length of the rail 25, in FIG. 1*a* to the left towards the container 3 into its operating position (i.e. operatively connected to the container 3 for gravimetric metering) and to the right, away from it, into its maintenance position (i.e. detached from the container 3 and accessible for maintenance work).

Under the outer end area 27 of the rail 25 there is a second support 31 arranged on the frame, on which a support bearing 32 for the outer end area 27 of the rail 25 is arranged. Furthermore, lateral limit stops 33, 33' of a limiting arrangement 34 are provided on the second support 31 (see FIG. 1*b*). The limit stop 33' is concealed by the limit stop 33 in the figure.

FIG. 1*b* shows the embodiment of FIG. 1*a*, wherein the base unit 4 has been moved into its maintenance position. Its weight now rests on the outer end area 27 of the rail 25, which, as it is designed in embodiments to be vertically resilient in accordance with this weight, has lowered until the end area 27 strikes the support 32 and rests on it. The outer end area 27 is then simultaneously retracted between the lateral limit stops 33, 33' and is fixed in a horizontal direction between these with a predetermined tolerance. This tolerance is predetermined by the suspension 12: if the base unit 4 is manipulated in the maintenance position, the rail 25 acts as a lever that transmits all the forces resulting from the manipulation to the container 3 and from this to the suspension 12, which must absorb these forces. In this manner, horizontally acting force components rotate the container 3 about its vertical axis 35. The tolerance in the limiting arrangement 34 permits a permissible twist and prevents further, no longer permissible twisting.

Complex reinforcement of the suspension 12 with regard to horizontally acting force components, which rotate the container 3 about its axis 35, is no longer necessary; conversely, a simplified, cost-effective suspension 12 is possible.

As a result, the outer end area 27 is supported by the frame, i.e. the weight of the base unit 4 is borne by the frame, and the forces acting laterally and resulting from maintenance are also absorbed by the frame 16 via the limit stops 33, 33'. Rotation of the container 3 about its vertical axis 35 is thus prevented or, depending on the design of the limiting arrangement 34, limited to a predetermined value. As a result, the suspension 12 can be designed in a simplified manner only for the weight forces of the metering unit 2, and the effort for the receptacle of forces or moments acting in the horizontal due to the maintenance of the base unit 4 is eliminated.

This means that the base unit 4 is mounted on the frame 16 in its maintenance position, but is completely decoupled from it in the operating position with the rail 27 floating freely (FIG. 1*a*), so that the frame 16 cannot exert any forces on it that could distort the weighing of the base unit 4 by the scales 14.

In embodiments, the rail 25 is designed to be resilient in the vertical direction and that a support bearing 32 is provided on the frame 16, on which the rail 25 rests when the resilient deflection is directed downwards, in such a manner that the rail 25 rests on the support 32 when the base unit 4 is in the maintenance position, but does not rest on the support 32 when the base unit 4 is in the operating position. Furthermore, in embodiments, a limiting arrangement 34 is provided on the frame 16, which limits rotation of the container 3 relative to the frame 16 about a vertical axis 35. The limiting arrangement (34) also, in embodiments, has stops (33, 33') connected to the frame (16), which interact with the rail (25).

However, it should be noted at this point that the parallel guide 17 and/or the support for the scales can also be designed solidly enough to absorb all the forces acting on the rail during maintenance—in this case, the vertical spring-elastic design of the rail and the expense of a limiting arrangement are unnecessary. There then remains the advantage of the simple design of the suspension itself, which only engages with the container 3, in connection with the rail arranged on the container, which no longer needs to be supported on the frame and thus ensures complete decoupling of the metering unit from the frame during gravimetric operation, at least in the direction of the weight force.

FIG. 2a shows a metering unit 40 in accordance with a further embodiment with a modified rail 41, which is designed in several parts. A container-side part 42 of the rail 41 is fixed with its one end 43 to the container and, in embodiments, extends horizontally away from the container 3. A likewise, in embodiments horizontally aligned, frame-side part 44 of the rail 41 is fixed to the frame 16. Both parts 42, 44 of the rail 41 are aligned with each other, but there is an intermediate space 45 between them, through which the container 3 is decoupled from the frame, but which is designed in such a manner that it can be passed over by the running element 29 of the supporting structure 28.

In the operating position of the base unit 4 shown in FIG. 2a, it rests on the inner part 42 of the rail 41 and is connected to the container 3; the scale 14 detects the full weight of the metering unit 2. The inner part 42 is decoupled from the frame 16 by the gap 45, and there are no forces exerted by the frame to distort the weight. During operation of the metering unit, the container is freely movable in the direction of the double arrow 48 due to the changing weight of the metering unit 2, wherein this movement generated by the scale 14 during the weighing process is permitted by the suspension 12 or the parallel guide 17—as is also the case in the embodiment according to FIG. 1a when the outer end area 27 of the rail 25 is free-floating.

In the maintenance position, the supporting structure 28 with the running element 29 rests on the outer part 44 of the rail 41, which is firmly connected to the frame, and is therefore supported by the frame 16, wherein manipulation forces acting on the base unit cannot be transmitted to the container 3 due to the gap 45, so that its suspension is in turn protected from the corresponding stress and can be designed in a simplified manner only for the weight forces of gravimetric operation.

In embodiments, the rail 41 is designed in several parts, wherein a part 42 on the container side is connected to the container 3 and a part 44 on the frame side is connected to the frame 16, and wherein the parts 42, 44 of the rail 41 are aligned with one another in such a manner that they can be moved relative to one another, in such a manner that the supporting structure 28 can be moved via an intermediate space 45 between the aligned ends.

FIG. 2b shows a view of the rail 41 from above, in a further embodiment modified compared to FIG. 2a. A section of the container 3, to which the inner part 42 of the rail 41 is fixed, and a section of the frame 16, to which the outer part 44 of the rail 41 is fixed, can be seen. Both parts 42,44 are aligned, wherein the intermediate space 45 is formed between the facing and oppositely shaped ends 46,47 of the parts 42,44. In the embodiment shown, rectangular cut-outs 46 are provided on the part 42, into which rectangular protrusions 47 of the part 44 project. This design allows the container-side part 42 to move freely relative to the frame-side part 44 in the direction of the double arrow 48 (FIG. 2a) via the intermediate space 45 (i.e. the container 3 is decoupled from the frame), although the intermediate space 45 is designed in such a manner that it can be easily traversed by the supporting structure 28 or the running element 29.

Furthermore, this embodiment has the advantage that a rotation of the container 3 in the suspension 12 is limited, for example already when the base unit 4 is released from its operating position, since the cut-outs 46 and protrusions 47 interacting with one another then abut laterally against one another. The protrusions 47 or cut-outs 46 therefore represent side stops of a limiting arrangement 49 and act analogously to the stops 33, 33' in accordance with FIGS. 1a and b.

It should be noted that the person skilled in art can form the intermediate space 45 or the pairing of protrusions/cut-outs as desired in the specific case, in order to achieve the effect in accordance with the specific design of the suspension 12 and the running structure 28.

In embodiments, the limiting arrangement 32 has lateral, interacting stops at the aligned ends of the rail 41, for example alternately interlocking protrusions 47 and cut-outs 46.

FIGS. 3a to c show a metering unit 50 in a side view (FIG. 3a), a view from below (FIG. 3b) and a three-dimensional section from diagonally below onto the rail 51 and the limiting arrangement 52 of the metering unit 50 (FIG. 3c). In each figure, a coordinate system 53 shows the height h, length l and width b of the metering unit 50. In FIG. 3d, the rail 75 with the limiting arrangement 52 of the metering unit 50 is shown in more detail in the manner of an exploded view.

FIG. 3a shows a side view of a metering unit 50, having a cylindrically designed container 54 for bulk material of a metering device 55, which has a connection piece 56 for bulk material to be refilled, a transition funnel 57 and a conveying container 58 (in which an invisible horizontal screw conveyor runs), wherein a conveying pipe 59, through which the screw conveyor extends further, opens from the conveying container 58 to the left into a vertical transition pipe 60, from which the metered bulk material is discharged downwards. A motor 61 drives the screw conveyor, wherein the gearbox 62 (see FIG. 3b) between it and the screw conveyor (which corresponds to the gearbox 9 of FIG. 1a) is covered by an outer vertical support 63 of the frame 64 of the metering unit 50. In the embodiment shown, the motor 61, the gearbox 62, the transition funnel 57, the conveying container 58, the conveying pipe 59 and the transition pipe 60 form the base unit 73 of the metering device 55.

The outer vertical support 63 conceals a second outer vertical support 63' located behind it, and an inner vertical support 65 of the frame 64 also conceals an inner vertical support 65' located behind it. The vertical carriers 63, 63', 65, 65' stand on a base plate 66 and carry, among other things, an outer and upper transverse carrier 67, which is concealed by the outer vertical carrier 63 in FIG. 3a, but is shown in dashed lines for a better overview. The transverse carrier 67 is designed in cross-section as an inverted U and is visible from below in FIG. 3b.

The transverse carrier 67 serves as a support for a scale 68, on which the container 67 is supported by a vertical carrier element 69 (which corresponds to the cantilever 13 of FIG. 1a) provided with a cantilever 69'. The carrier element 69 is part of the suspension 80.

On the opposite, inner side of the metering unit 50, a vertical frame portion 70 of the suspension 80 can be seen, on which an upper parallel arm 71 and a lower parallel arm 72 are arranged, which in turn vertically displaceably support the container 54, insofar as this is necessary due to the movement of the scale 68 during the weighing process. A controller 74 is arranged here on the metering unit 50 itself and controls the metering process, which is basically known to the person skilled in art, in a conventional manner.

FIG. 3b shows the metering unit 50 from below, wherein the scale 68 is covered by the transverse carrier 67. The trapezoidal contour of the frame 64 can be seen, with a narrow side at the location of the transition pipe 60 and the wide side on the exterior side, where the controller is also arranged. This arrangement allows a group of here six metering units 50 to be arranged as a hexagon around a common collector not shown in the figure.

Also shown is a second portion 81 of a further embodiment of a rail 75 (FIGS. 3c and 3d) and a second side portion 98 of a correspondingly designed limiting carrier 95 (FIGS. 3c and 3d) of a limiting arrangement 52, which limits rotation of the container 54 about its vertical axis 35.

FIG. 3c shows a section of the metering unit 50 in three-dimensional view, obliquely from below, with a view of the rail 75 projecting away from the container 54, which is surrounded by a protective casing 76 arranged on the transverse carrier 67. As mentioned above, the transverse carrier 67 is designed in cross-section as an inverted U and is arranged with the closed side towards the top on the vertical carriers 63, 63' and carries the scale 68, wherein this in turn carries the vertical carrier element 69 and thus the container 54 via the support arm 69' (see also FIG. 3a).

A downwardly extending carrier portion 77 of the carrier element 69 ends in a horizontally aligned connecting plate 78, to which in turn a mounting head 79 of the rail 75 is fastened, so that the rail 75 is fixed to the carrier element 69 (and thus to the container 54). The rail 75 is represented in detail in FIG. 3d.

In the embodiment shown, the rail 75 has a first portion 82 extending away from the container 54 and a second portion 81 which subsequently adjoins it and is angled towards it. Furthermore, in the embodiment shown, the rail 75 is designed as a double rail, with two individual rails 85 and 86 extending laterally next to one another, which are arranged at a distance from one another and thus form a gap through which the mast 87 projects, on which the base unit 73 (see also FIG. 3a) is suspended.

In addition to the supporting structure 83 for the base unit 73, the mast 87 has a running element designed as a lower 85 and upper sliding disk 86. If the clamping disks or sliding disks 88 and 89 are braced against each other, they fix the base unit 73 to the rail 75, in FIG. 3c in its operating position. If the sliding disks 88,89 are released from one another, the base unit 73 can be displaced along the gap between the individual rails 85,86 via the mast 87.

The base unit 73 is moved into the maintenance position by releasing a clamping ring 90, which connects the transition funnel 58 to the container 54, via its clamping screw 91, so that it now hangs in the rail 75 supported only by its supporting structure 83. Then the base unit 73 with the disengaged sliding disks 88,89 can be pulled away from the container 54 until the screw conveyor is pulled out of the transition pipe 60, which is generally the case when the supporting structure 83 or the mast 87 is in an outer area of the first portion 82 of the rail 75. There, the base unit 73 can be rotated counterclockwise about the axis of the mast 87 and simultaneously pushed along the second portion 81 until the screw conveyor is parallel to and outside the transverse carrier 67. One of the advantages of this design of the rail 75 is that the base unit 73 does not have to be pulled away from the container 54 in a straight line over the entire length of the screw conveyor, which saves space and allows tighter space conditions in the specific line from the point of view of maintenance.

For this purpose, the supporting structure 83 is designed in embodiments in such a manner that it allows the base unit 73 to rotate relative to the rail 75. In the embodiment shown, this is easily possible, as the mast 87 can be rotated at any time in the gap between the individual rails 85, 86 in accordance with the layer of the screw conveyor when the sliding disks 88, 89 are loosened against one another. In embodiments, the supporting structure 83 has a mast 87 projecting between the individual rails 85, 86 and in embodiment a disk 89 resting on the individual rails 85, 86, which is designed as a sliding disk.

FIG. 3d shows, in the manner of an exploded view, the rail 75 and a limiting carrier 95 comprising the rail 75 in the assembled state, as shown in FIG. 3c.

In addition to the connecting plate 78, with which the rail 75 is fastened to the downwardly extending carrier portion 77, and thus to the container 54 (see FIG. 3c), it also has a first limiting cam 100, which projects outwards at the end of its first portion 82, and a second limiting cam 101, which in the embodiment shown projects away from the second portion 81 on its face side at the end of the latter.

Both limiting cams 100,101 each have a rectangular outline, a lower side 102, 103, an opposite upper side hidden in the figure by the lower sides 102,103, a face side 104,105 and a left side 106,107 and right side 108,109, wherein a left shoulder region 110,111 and a right shoulder region 112,113 are adjacent to the left 106, 107 and right side.

The limiting carrier 95 has a mounting portion 96, which is fixed to the transverse carrier 67 of the frame 64, and a first side portion 97 and a second side portion 98, in which a first limiting opening 114 and a second limiting opening 115 are provided. The limiting openings 114, 115 are formed by inner 116, 117 and outer limiting edges 118, 119 as well as lower 120, 121 and upper limiting edges 122, 123. Further, a cut-out 124 is provided in the mounting portion 96 to allow the first portion 82 of the rail 75 to pass therethrough.

In the assembled state, the rail 75 lies in the limiting carrier 95 in such a manner that the limiting cam 100 protrudes through the limiting opening 114 and the limiting cam 101 protrudes through the limiting opening 115, but does not make contact with the corresponding limiting edges of the limiting openings 114,115 either with the shoulder regions 110,112 and 111,113 or with the left 106,107 or right sides 108,109 or with the lower sides 102,103 or the opposite upper sides. At the same time, the first portion 82 of the rail 75 protrudes through the cut-out 124 so that the mounting portion 78 is located behind the mounting portion 96 and behind the transverse carrier 67, where it is fixed to the vertical carrier portion 77.

In other words, the limiting cams 100,101 of the rail 75 project freely and without striking through the limiting openings 114, 115 as long as no forces are acting on the rail 75, i.e. the base unit 73 is in the operating position and is not subjected to any undesirable force, as is also represented in FIG. 3c.

In contrast, if the base unit 73 is moved outwards along the first portion 82 of the rail 75 away from the operating position: then the vertically elastically designed rail 75 lowers downwards (principle in accordance with FIG. 1a) until the lower sides 102, 103 of its limiting cams 100,101 strike against the lower limiting edges 120, 121 of the limiting openings 114, 115, whereby the limiting carrier 95 and via this the transverse carrier 67 takes over the weight of the base unit 73—the rail 75 is then coupled to the frame 64 via the weight force of the base unit 73.

It is also different if a horizontally acting force is exerted on the base unit 73, which threatens to twist the container 54 about its axis 35: the rail 75 then strikes with the left 110,111 or right 112 shoulder regions against the corresponding edges of the limiting opening 114,115, so that this force is in turn absorbed by the limiting carrier 95 or the frame 64 and thus the suspension 80 of the metering unit 50 is only stressed to the intended extent.

Similarly for all other forces acting on the base unit: if this causes the rail 75 to displace in any direction, it strikes with the limiting cams 100,101 against the corresponding edges 116 to 123 of the openings 114,115, so that these forces are transmitted via the limiting carrier 95, thus into the transverse carrier 67, i.e. the frame 64, and cannot excessively stress the suspension 80.

As a result, the intermediate space between the limiting cams 100, 101 and the limiting openings 114, 115 is only dimensioned to be large enough for the suspension 80 to withstand movement of the rail 75 until the limiting cams 100, 101 come into contact with the limiting openings 114, 115 without damage. It can be seen that, in embodiments, the limiting arrangement (34) has a limiting carrier 95 which is fixed relative to the frame 64 and has openings 114, 115, the edges 116 to 123 of which form limiting stops for limiting cams 100, 101 provided on the rail 75.

Figure 4:
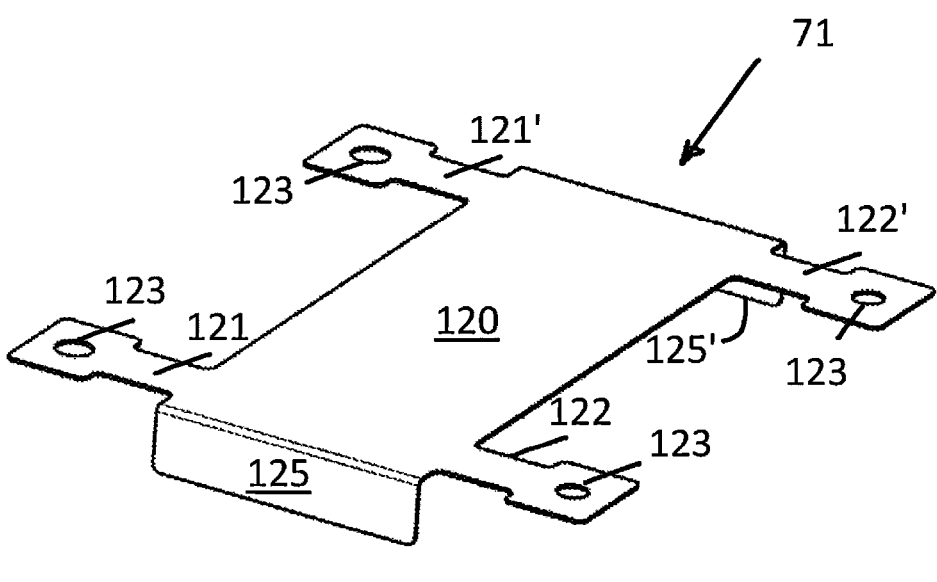

FIG. 4 shows an oblique view from above of an embodiment for a parallel arm 71 of the metering unit 50 (FIG. 3a), which consists of an elastically deformable material such as sheet metal, has a rectangular body 120 and, in the area of its four corners, connecting tongues which project from it, are aligned in parallel, act as leaf springs 121, 121', 122, 122' and are provided at the end with a hole 123 for a screw, so that they can be fastened to the frame 64, to a vertical frame portion 70, or to a suitably designed transition piece 140 on the container 54 (see FIG. 3a). The leaf springs 121, 121' are bolted to the frame portion 70 and the leaf springs 122, 122' are bolted to the transition piece 140. Due to their dimensioning, the leaf springs 121, 121', 122, 122' act as joints for the parallel arm 71 in such a manner that they allow the required vertical movement of the container 54 in an operable manner—as mentioned, the dimensioning depends on the type of scale used and can easily be suitably carried out by the person skilled in art. In the case of a vibrating wire scale, the necessary vertical travel of the container 54 is in the area of a fraction of a millimeter, but is nevertheless essential to prevent upward bearing forces of the frame section 70 from distorting the weight measured by the scale 68.

The parallel arm 71 further has laterally folded stiffening areas 125,125' on the sides between the leaf springs 121,122 and between the leaf springs 121', 122', which stiffen the parallel arm 71 between the respective leaf springs in a defined manner, so that its body 120 acts as a rigid lever which is attached to the frame and to the container 54 via the joints formed by the leaf springs 121, 121', 122, 122'.

The lower parallel arm 72 (FIG. 3a) is designed in the same manner as the upper parallel arm 71.

It can be seen that the parallel arms (18, 19, 71, 72), in embodiments, have joints designed as leaf springs 121, 121', 122, 122'.

Figure 5:
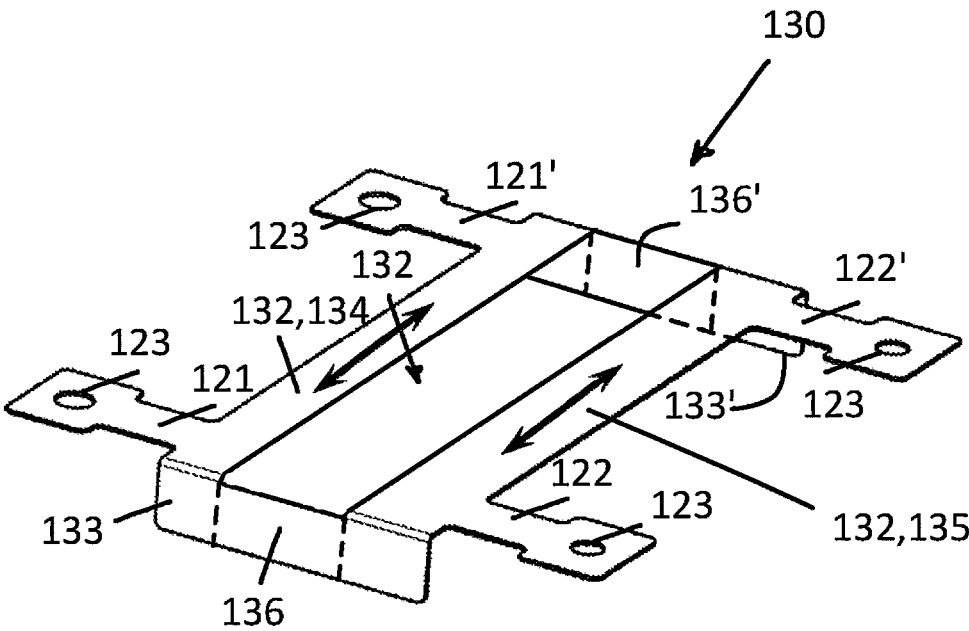

FIG. 5 shows a further embodiment of a parallel arm 130, which is basically designed in the same manner as the parallel arm 71,72, but has a cut-out 132 in its body 131, which runs across its entire width as far as the folded stiffening areas 133,133', in such a manner that the body 126 is divided into two parallel strips 134, 135 running across the width of the parallel arm 130, which are connected to one another via the folded areas 133, 133'. The dashed portions of the folded areas 133,133' between the strips 134, 135 shown in FIG. 6 now act as vertical horizontal leaf springs 136, 136', which enable the strips 134,135 to be displaced relative to the horizontal in accordance with the double arrows shown.

The parallel arm 130 thus enables not only the vertical movement required by the scale 68, but also a lateral displacement of the container 54, as is necessary approximately when the vertical frame portion 70 and the container axis 35 (see FIG. 3a) are not exactly parallel, but somewhat interlocked. Although this will be less the case with a metering unit 50 in accordance with FIGS. 3a to d, it may be necessary in particular if the container rests on two scales instead of one, so that the support points of the two scales form a three-point support with the parallel guide. In this case, the support points of the two scales cannot be at exactly the same height, so that the container is inclined at a slight angle to the vertical and thus also at a slight angle to the parallel guide. The parallel arm 130 is then able to allow a slight lateral deviation of the container area it supports.

Again, the lateral deviation is usually in the millimeter range, but must necessarily be allowed depending on the type of scale used: If the parallel guide were to guide the container exactly vertically, the load on one of the two scales would be increased and the other reduced, as in accordance with the initial position, the scales are not at exactly the same height. The overloaded scale may then operate above its intended operating range, which can lead to undesirable hysteresis in the measuring signal, distorting the measurement result and reducing the quality of the metering.

It results that, in embodiments, a parallel arm 18, 19, 71, 72 further has at least one horizontally acting joint, which is in embodiments designed as a leaf spring 136, 136', further in embodiments in the case of a gravimetric metering unit in which two scales are provided.

It should be noted at this location that the container can also be arranged on three scales, wherein a parallel guide is then omitted, but a rail 25,75 is provided, with a limiting arrangement 34,52 in embodiments. It should also be noted that the suspension, in embodiments, has a ball support which interacts with a scale assigned to it to transmit the weight to be weighed. At its upper end, where the weight is to be picked up, the scale has a spherically designed surface which interacts with a slightly wider spherical or elliptical cavity of the same shape in, for example, a cantilever 13, 69' (FIG. 1a, 3a), thus enabling the cantilever to be moved slightly sideways in relation to the scale without affecting the precise weight measurement.

The overall result for embodiments is a gravimetric metering unit for bulk materials, wherein the metering unit has a container for bulk material to be metered and a base unit with a horizontally arranged conveyor for the bulk material, wherein the container and the base unit are detachable from one another for maintenance, with a frame on which at least one scale is arranged, on which in turn the metering device is operatively supported via a suspension, in such a manner that the metering unit is designed for gravimetric metering, wherein the suspension is connected to the container of the metering unit and carries it over the container, the container in turn is provided with a rail projecting away from it, and wherein the base unit has a supporting structure running on the rail in such a manner that it can be moved back and forth between an operating position and a maintenance position.

The invention claimed is:

1. A gravimetric metering unit for bulk material, having a metering device which comprises a container for bulk material to be metered and a base unit which has a non-vertically arranged conveyor for the bulk material, wherein the container and base unit are detachable from one another for maintenance, and with a frame on which at least one scale is arranged, on which in turn the metering device is operatively supported via a suspension, in such a manner that the metering unit is designed for gravimetric metering, wherein the suspension is connected to the container of the metering unit and supports the latter through its container, the container is in turn provided with a rail projecting away from it, and in that the base unit has a supporting structure running on the rail in such a manner that it can be moved back and forth between an operating position and a maintenance position.

2. The gravimetric metering unit according to claim 1, wherein a limiting arrangement is provided on the frame, which limits a rotation of the container relative to the frame about a vertical axis.

3. The gravimetric metering unit according to claim 1, wherein the limiting arrangement has stops connected to the frame and cooperating with the rail.

4. The gravimetric metering unit according to claim 1, wherein the rail is designed to be resilient in the vertical direction and a support is provided on the frame, on which the rail rests when the resilient deflection is directed downwards, in such a manner that the rail rests on the support when the base unit is in the maintenance position, but does not rest on the support when the base unit is in the operating position.

5. The gravimetric metering unit according to claim 1, wherein the rail is designed in several parts, wherein a part on the container side is connected to the container and a part on the frame side is connected to the frame, and wherein the parts of the rail are aligned with one another so as to be relatively movable, in such a manner that the supporting structure can be moved via an intermediate space between the aligned ends.

6. The gravimetric metering unit according to claim 2, wherein the limiting arrangement has lateral, mutually cooperating stops at aligned ends of the rail.

7. The gravimetric metering unit according to claim 1, wherein the rail has a portion extending away from the container and a subsequently angled second portion with respect to the first.

8. The gravimetric metering unit according to claim 1, wherein the rail is designed as a double rail with two individual rails extending laterally next to one another and arranged at a distance from one another.

9. The gravimetric metering unit according to claim 1, wherein the suspension has a parallel guide with parallel arms, which is connected on the one hand to the frame and on the other hand to the container, in such a manner that the container is suspended so as to be vertically movable relative to the frame.

10. The gravimetric metering unit according to claim 2, wherein the limiting arrangement has a limiting carrier which is fixed relative to the frame and has openings, the edges of which form limiting stops for limiting cams provided on the rail.

11. The gravimetric metering unit according to claim 9, wherein the parallel arms have joints designed as leaf springs.

12. The gravimetric metering unit according to claim 9, wherein a parallel arm further has at least one horizontally acting joint.

13. The gravimetric metering unit according to claim 1, wherein the supporting structure is designed in such a manner that it allows the base unit to rotate relative to the rail.

14. The gravimetric metering unit according to claim 8, wherein the supporting structure has a mast projecting between the individual rails.

15. The gravimetric metering unit according to claim 1, wherein two scales are provided.

16. The gravimetric metering unit according to claim 1, wherein three scales are provided.

17. The gravimetric metering unit according to claim 1, wherein the suspension has a ball support which cooperates with a scale associated therewith for transmitting the weight to be weighed.

* * * * *